UNITED STATES PATENT OFFICE.

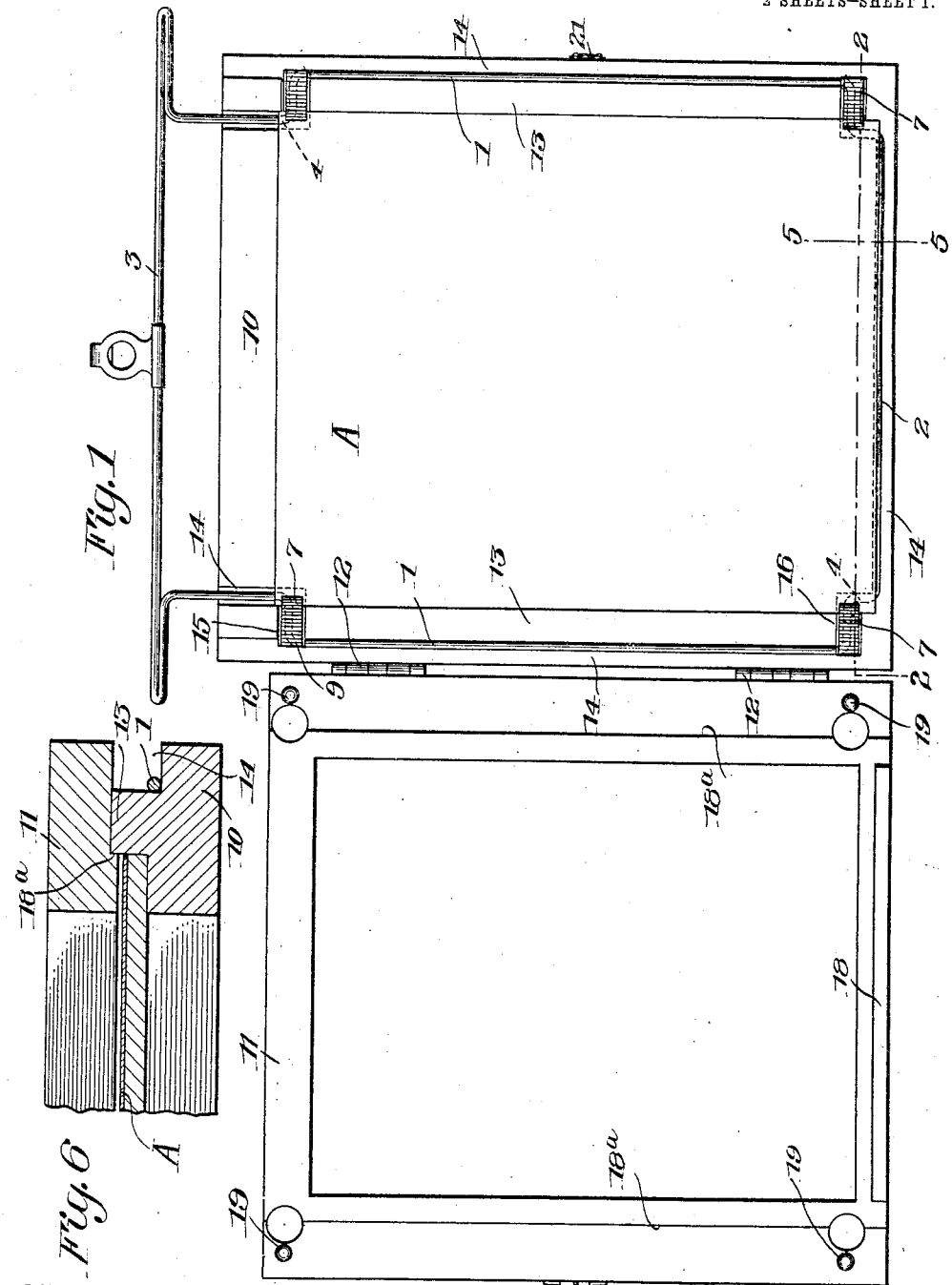

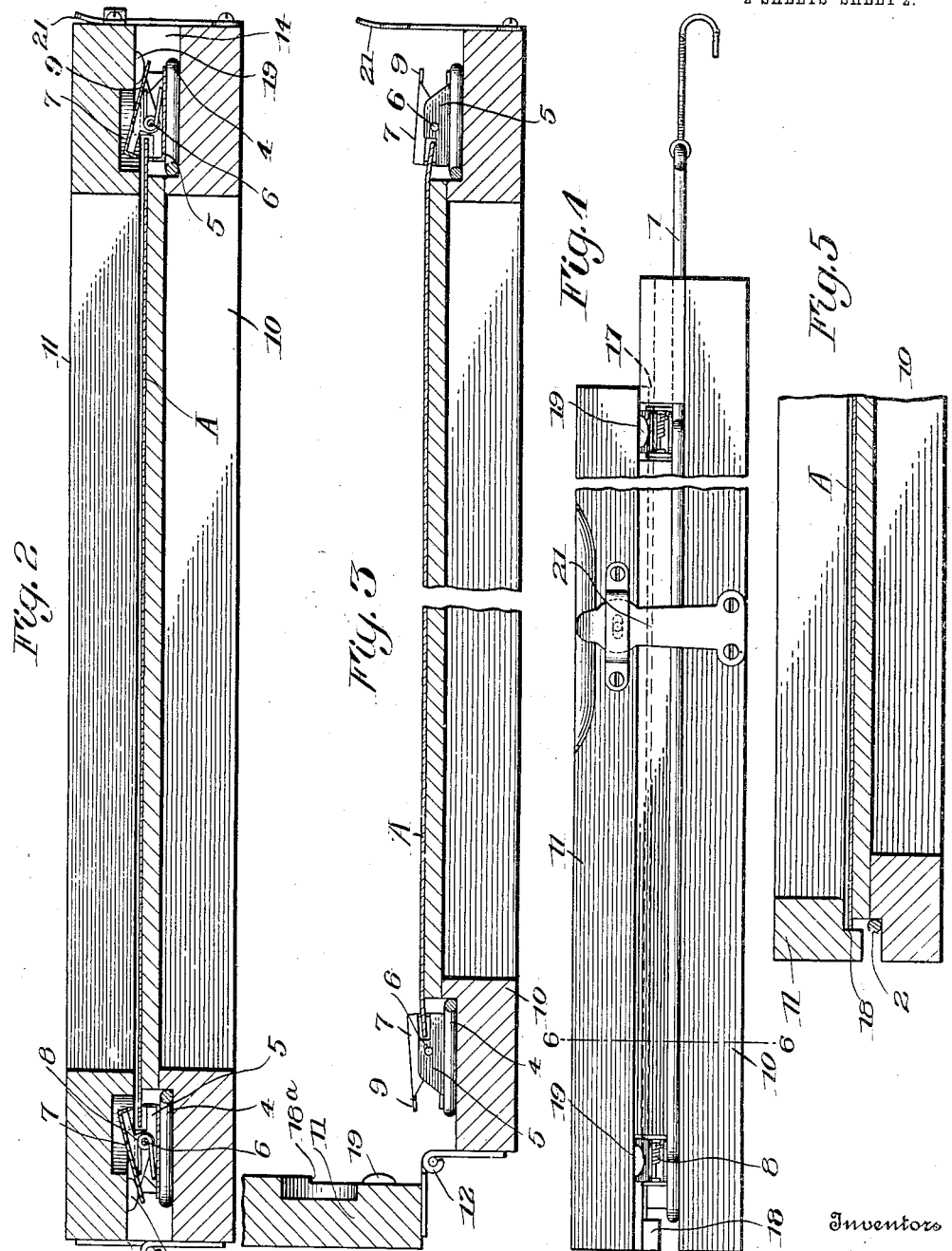

FREDERICK W. BARNES AND FRANK W. LOVEJOY, OF ROCHESTER, NEW YORK, ASSIGNORS TO EASTMAN KODAK COMPANY, OF ROCHESTER, NEW YORK, A CORPORATION OF NEW YORK.

LOADING DEVICE FOR CUT-FILM HOLDERS.

1,113,288.  Specification of Letters Patent.  Patented Oct. 13, 1914.

Application filed June 11, 1914. Serial No. 844,577.

*To all whom it may concern:*

Be it known that we, FREDERICK W. BARNES and FRANK W. LOVEJOY, of Rochester, in the county of Monroe and State of New York, have invented certain new and useful Improvements in Loading Devices for Cut-Film Holders; and we do hereby declare the following to be a full, clear, and exact description of the same, reference being had to the accompanying drawings, forming a part of this specification, and to the reference-numerals marked thereon.

Our present invention relates to photography and more particularly to handling devices for sensitized sheets such as the cut films or thin flexible sheets that are now quite generally used in lieu of glass or rigid plates.

In a companion application Serial No. 838,190, filed May 13, 1914, we have described and claimed a holding frame or carrier for such sheets whereby their manipulation during the processes of developing, washing, fixing and drying is rendered safe and convenient.

It is the object of the present invention to provide a simple, cheap and efficient device that will be of marked assistance in loading cut films or similar sensitized mediums into frames or holders of that nature with accuracy and despatch.

To these and other ends the invention consists in certain improvements and combinations of parts, all as will be hereinafter more fully described, the novel features being pointed out in the claims at the end of the specification.

In the drawings: Figure 1 is a plan view of a loading device constructed in accordance with and illustrating one embodiment of our invention, the same being shown in open position to receive or release the frame, which latter, with a film sheet in place, is shown positioned therein; Fig. 2 is an enlarged sectional view taken substantially on the line 2—2 of Fig. 1, but with the loader in closed position in which it confines the frame in place but releases the sheet retaining devices thereof; Fig. 3 is a view corresponding to Fig. 2 after the loader has been again opened to free the sheet retaining devices; Fig. 4 is an enlarged side elevation of the loader with an intermediate portion broken away; Fig. 5 is an enlarged fragmentary section taken on the line 5—5 of Fig. 1 with the loader in closed position, and Fig. 6 is a detail fragmentary section taken substantially on the line 6—6 of Fig. 4.

Similar reference numerals throughout the several figures indicate the same parts.

The particular film holding device for which the loader illustrated is designed need be only briefly described, particularly in view of our said companion application in which it is fully explained. In general, it consists (Fig. 1) of a rectangular wire frame comprising side rails 1 and end rails 2 and 3, the latter constituting the supporting and manipulating portion of the frame. Mounted upon an inwardly turned jog 4 in the wire at each of the four corners is a sheet engaging and retaining clip composed of a lower stationary jaw 5 (Figs. 2 and 3) carrying a pintle 6 and an upper movable jaw 7 turning on the pintle 6 and held normally closed against the lower jaw by a spring 8 encircling the pintle. In the closed position, the jaws automatically grip and retain the film sheet A, at its four corners, but may be released by pressing down upon the operating portions 9 of the upper or movable jaws.

The loading device itself preferably comprises two relatively movable clamping members 10 and 11 that may be closed together or swung apart on hinged connections 12. The first mentioned member consists, in the present instance, of a back board having raised ribs 13 along its two sides forming guides that are encompassed by a continuous groove or depression 14 in which the rails 1 and 2 of the sheet holding frame are adapted to lie in the manner shown in the figures. The depth of the depression is such that the openings between the retaining jaws 5 and 7 of the clips on the frame come flush with the surface of the back board and are in a position alined to inevitably receive the edges or corners of the film sheet A when the latter is thrust along the face of the board between the guiding ribs 13. The latter are cut away at 15 and 16 to accommodate the clips.

The other member 11 we term the retaining frame and when this is folded over upon the back board as shown in Figs. 2, 4 and 5, it rests upon the ribs 13 and is held spaced from the back board at the top, as indicated at 17 in dotted lines in Fig. 4 to provide a throat through which the film sheet A may be inserted between the members and within the frame, while at the other or lower end it is provided with an overlapping ledge or rib 18 received within the depression 14 above the frame rail 2 to constitute an abutment forming a stop for the advance edge of the sheet A to halt it in proper position. In addition to the rib 18, we prefer to also provide similar ribs or shoulders 18$^a$ at the sides of the frame 11 which overlap the guiding ribs 13 on their inner sides, as shown in Fig. 6, when the frame is closed down against the back board and prevent the inserted film from overriding the guides and becoming caught between the members.

The more important function of the cover frame 11, however, is to automatically and jointly open the jaws 5 and 7 of the sheet retaining clips on the holding frame. It accomplishes this by automatically engaging and depressing the several operating portions 9 of the movable upper jaws 7, holding the latter open against the tensions of their springs and as shown in Fig. 2 while the two members 10 and 11 are together. To these ends, we provide four buttons 19 at suitable points on the frame 11 to insure proper contact with the several operating portions 9 and adjacent recesses 20 to accommodate the jaws as the same are raised. A suitable catch 21 (Fig. 4) may be provided to hold the cover frame and clip releasing device 11 down upon the backing 10.

The mode of operation will be apparent from the foregoing description.

The members 10 and 11 are opened and the holding frame 1 inserted in the depression 14 of the back board 11. The cover frame 11 is then closed down and secured at 21, opening the jaws 7. The film sheet A is inserted between the members, its proper position being defined by the guides 13 and stop 18. When so inserted, its corners pass between the several sets of jaws 5 and 7. Therefore, upon raising the cover frame 11 again, the jaws 7 are released and grip the sheet A and when the holding frame is removed, the said sheet is carried out with it properly held therein by its corners and ready for manipulation through the vehicle of the frame.

It is evident that sheets may be released from the frame 1 by the same process.

The apparatus can be used to advantage with other more or less rigid sheets than film sheets and it is obvious that the backing board 10 instead of being solid, could have its central portion removed in the manner of a frame while the frame 11 could be closed or have a continuous surface, the terms "backing board" and cover "frame" being used largely for the purpose of convenience in the description.

We claim as our invention:

1. A loading device of the character described comprising two relatively movable clamping members, one of which is provided with positioning means for a film holding frame inserted between them, the members being formed to admit a film sheet edgewise when the latter is inserted within the said frame.

2. A loading device of the character described comprising two relatively movable clamping members provided with positioning means for a film holding frame inserted between them and with guides for directing a film sheet inserted between them within such frame.

3. A loading device of the character described comprising two relatively movable clamping members arranged to contact along three sides when closed together, the fourth side being open for the insertion of a film sheet, and means for positioning a film holding frame between the members to receive a film sheet so inserted.

4. In a loading device of the character described, the combination with a back board provided with raised film guiding ribs at its two sides and with depressions adapted to accommodate a film holding frame, of a relatively movable cover frame adapted to be superposed on the back board having one end spaced from the latter to permit the insertion of a film sheet between the guides and into the frame and having a raised rib at the other end forming a stop for the film sheet to position it in the frame.

5. A loading device of the character described embodying a back board having means for positioning a film holding frame laid thereon and guides for directing a film sheet into said frame.

6. A loading device of the character described embodying a back board having an encircling depression for positioning a film holding frame and raised ribs within the compass of said depression arranged to act as guides for directing a film sheet within such frame.

7. In a loading device of the character described, the combination with a back board, of a separate film sheet holding frame having film retaining devices thereon and adapted to be disposed upon the back board, means on the latter for positioning the frame and guides on the back board for directing a film sheet into the retaining devices of the frame.

8. In a loading device of the character described, the combination with a back board, of a separate film sheet holding frame having film retaining jaws thereon and adapted to be disposed against the back board, means on the latter for positioning the frame, a releasing member adapted to coöperate with the jaws to hold them open and guides on one of the parts for directing a film sheet into the jaws.

9. In a loading device of the character described, the combination with a back board, of a separate film sheet holding frame having a plurality of sets of film retaining jaws thereon and adapted to be disposed against the back board, means on the latter for positioning the frame, a releasing member mounted to move in a fixed path relatively to the back board and to coöperate with all of the sets of jaws to hold them open and guides on one of the parts for directing a film sheet into the jaws.

10. In a loading device of the character described, the combination with a back board and a cover frame hinged thereto to move against the same, of a separate film sheet holding frame having a plurality of sets of film sheet retaining jaws thereon adapted to be released or held open by the cover frame when the latter is against the back board, means on the latter for positioning the frame so that the openings between the jaws are flush with the surface of the back board and guides for directing a film sheet entered between the back board and cover frame into the jaws.

11. In a loading device of the character described, the combination with a back board provided with film guiding ribs at its two sides and with means for positioning a film holding frame, of a relatively movable cover frame adapted to be superposed on the back board having one end spaced from the latter to permit the insertion of a film sheet between the guides and into the frame and having ribs or shoulders adapted to overlap the guiding ribs on the back board at their inner sides to prevent the film sheets from overriding the guiding ribs.

FREDERICK W. BARNES.
FRANK W. LOVEJOY.

Witnesses:
M. B. LAIDLAW,
LEWIS B. JONES.